(12) United States Patent
Tsai et al.

(10) Patent No.: US 7,039,656 B1
(45) Date of Patent: May 2, 2006

(54) METHOD AND APPARATUS FOR SYNCHRONIZING DATA RECORDS BETWEEN A REMOTE DEVICE AND A DATA SERVER OVER A DATA-PACKET-NETWORK

(75) Inventors: Sin-Mei Tsai, San Francisco, CA (US); Neil Daswani, Edison, NJ (US); Doug Diego, San Rafael, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 975 days.

(21) Appl. No.: 09/629,200

(22) Filed: Jul. 31, 2000

Related U.S. Application Data

(63) Continuation-in-part of application No. 09/422,280, filed on Oct. 20, 1999.

(51) Int. Cl.
*G06F 17/30* (2006.01)

(52) U.S. Cl. ...................... 707/201; 717/171
(58) Field of Classification Search ........ 713/200–202, 713/176, 181; 707/1, 3, 6, 200, 201, 204; 717/168–173
See application file for complete search history.

(56) References Cited

U.S. PATENT DOCUMENTS

| | | | | |
|---|---|---|---|---|
| 5,485,608 A * | 1/1996 | Lomet et al. | | 707/202 |
| 5,710,922 A * | 1/1998 | Alley et al. | | 707/201 |
| 5,999,947 A * | 12/1999 | Zollinger et al. | | 707/203 |
| 6,044,381 A * | 3/2000 | Boothby et al. | | 707/201 |
| 6,199,077 B1 * | 3/2001 | Inala et al. | | 715/501.1 |
| 6,223,187 B1 * | 4/2001 | Boothby et al. | | 707/201 |
| 6,412,073 B1 * | 6/2002 | Rangan | | 713/202 |
| 6,460,055 B1 * | 10/2002 | Midgley et al. | | 707/204 |
| 6,463,427 B1 * | 10/2002 | Wu | | 707/3 |
| 6,477,565 B1 * | 11/2002 | Daswani et al. | | 709/217 |
| 6,526,418 B1 * | 2/2003 | Midgley et al. | | 707/204 |
| 6,625,623 B1 * | 9/2003 | Midgley et al. | | 707/204 |
| 6,779,003 B1 * | 8/2004 | Midgley et al. | | 707/204 |
| 2002/0049764 A1 * | 4/2002 | Boothby et al. | | 707/100 |
| 2002/0161769 A1 * | 10/2002 | Sutinen et al. | | 707/10 |
| 2003/0037020 A1 * | 2/2003 | Novak et al. | | 701/1 |
| 2003/0117434 A1 * | 6/2003 | Hugh | | 345/744 |
| 2005/0071386 A1 * | 3/2005 | Wolfgang et al. | | 707/201 |

FOREIGN PATENT DOCUMENTS

WO 98/54662 * 12/1998

* cited by examiner

*Primary Examiner*—Christopher Revak
(74) *Attorney, Agent, or Firm*—Donald R. Boys; Central Coast Patent Agency, Inc

(57) ABSTRACT

A system for synchronizing data records between a network data server and a requesting client device has a client software application and a network server software application. The system is characterized in that the client application maintains a first table of unique identifiers for data records stored at the client and sends a copy of the table with a request for data from the server, and the server maintains a second table of unique identifiers for candidate data records to be sent to the client, the identifiers at server and client formed by a common process, and in that the server, on receiving the request and first table from the client, compares the first table and the second table, then sends to the client only those records indicated by the comparison as new to the client and a notification of table updates.

13 Claims, 9 Drawing Sheets

(CRC Data Synchronizing Process)

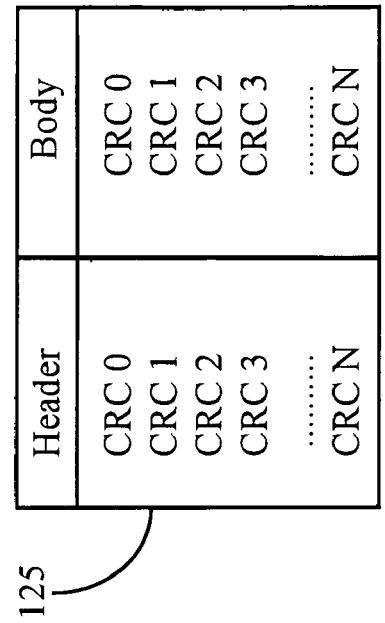
Fig. 7D
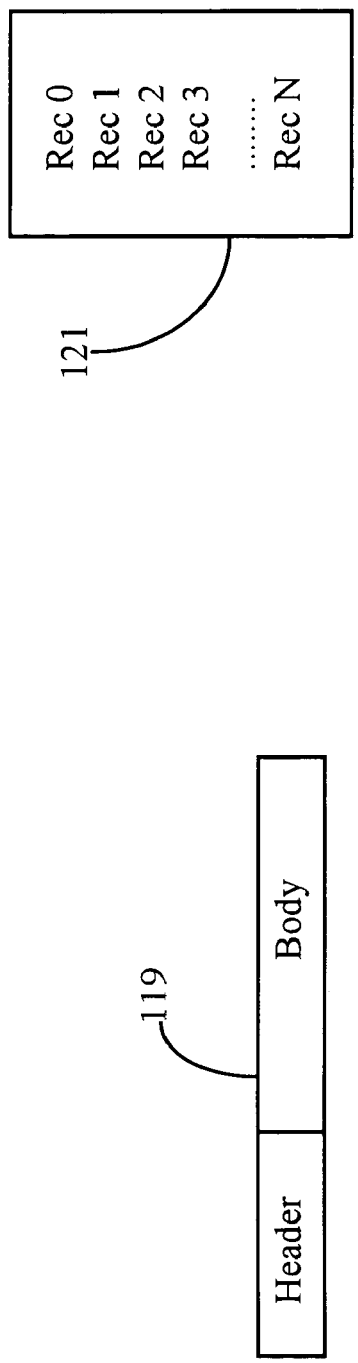
Fig. 7B
Fig. 7A
$$f_{CRC}(H) = CRC_H \text{ (A Unique 32-Bit Number)}$$
$$f_{CRC}(D) = CRC_D \text{ (A Unique 32-Bit Number)}$$
Fig. 7C

METHOD AND APPARATUS FOR SYNCHRONIZING DATA RECORDS BETWEEN A REMOTE DEVICE AND A DATA SERVER OVER A DATA-PACKET-NETWORK

CROSS-REFERENCE TO RELATED DOCUMENTS

The present invention is continuation-in-part (CIP) to a U.S. patent application entitled "Method and Apparatus for Providing Secure Authentication of Portable Devices Through Internet Host Servers", Ser. No. 09/422,280, filed on Oct. 20, 1999, which is related in some aspects to a patent application entitled "Method and Apparatus for Restructuring of Personalized Data for Transmission from a Data Network to Connected and Portable Network Appliances", Ser. No. 09/398,320, now U.S. Pat. No. 6,477,565, which is related also to U.S. patent application Ser. No. 09/323,598, now U.S. Pat. No. 6,199,077, filed on Jun. 1, 1999 and entitled "Method and Apparatus for Obtaining and Presenting WEB Summaries to Users", which is a continuation in part (CIP) of patent application Ser. No. 09/208,740, now U.S. Pat. No. 6,412,073, entitled "Method and Apparatus for Providing and Maintaining a User-Interactive Portal System Accessible via Internet or other Switched-Packet-Network" filed on Dec. 8, 1998, disclosures of which are incorporated here in their entirety by reference.

FIELD OF THE INVENTION

The present invention is in the field of data synchronization in transferring data across a data network, and related more particularly to methods and apparatus for synchronizing data records between a host system and various portable devices such as personal digital assistants (PDAs).

BACKGROUND OF THE INVENTION

Portable communication devices capable of linking to a data network such as the Internet are now being provided with more memory capabilities than has been usual in the past. This development has allowed users to store much more information on their portable devices than was previously possible. For example, a personal digital assistant (PDA) such as 3-Com's Palm Pilot™ now has up to 2 MB of memory. Such a PDA can store approximately 6,000 addresses, 5 years worth of scheduled appointments, and up to 200 e-mail messages.

In addition to the capability of storing more information on such as a PDA, users typically have much personal information stored in "back-end" database servers located anywhere on a data network such as the Internet. Companies such as Hotmail™ and Yahoo™ use these back-end servers to store e-mail and other message information for users.

Generally, a user wishing to access his or her e-mail account or other information account from a portable internet-capable device such as a PDA must have the device authenticated to the server storing the desired information. Conduit software on a cooperating PC is responsible for synchronizing the data on the portable device with the data in such a back-end server. The synchronization process is generally known in the art and involves replacing data on the portable with new updated data from the server and vice versa. In the simple case of e-mail, the conduit application downloads any new mail from the server and uploads any new mail authored by a user operating the PDA. In addition to e-mail, conduit programs are available for synchronizing data from many different types of data sources.

A problem with the prior art methods and systems is that for a user to successfully access and receive data to a portable device (PD) he or she must provide an appropriate password and log-in information to access the site. In other words, the data source must know the portable device by configuration and password. A user having many different sites that are routinely accessed would have to remember many passwords, log-in codes, screen names, etc. in order to successfully interact with all the sites. Moreover, conduit software programs that accomplish data synchronization tasks between network data sources and portable devices are typically proprietary in nature and configured only for one host that oversees the data sources. Such a host is typically the provider of the conduit application, which resides on a user's PC.

In a system known to the inventor and referenced under the documents listed in the Cross-Reference to Related Documents section, data may be collected, aggregated, and restructured to be delivered to or held for access for a variety of wireless portable devices including PDAs, cellular phones, and even such as paging devices. The system uses a data center for interfacing various portable devices that operate on usually wireless communication networks, and PC interfaces for communicating with such as PDAs and like peripherals. The system is capable of aggregating data from many sources into a common data store with each updated data summary tagged to a user ID. However, this system requires that a user of a portable device supply device configuration and authentication information to the service for accessing summary data. Therefore, a password and log-in is still required, at least for the aggregate service, in order to operate within the scope of the data gathering and presentation system known to the inventors.

It is desired that users of portable devices be relieved of a requirement for storing a variety of passwords, log-in names and the like on their machines for accessing various data sources. Although the data-gathering and presentation service, known also as an Internet portal service, maintains, and manages passwords and log-in names or codes for subscribers, authentication to the service still must be completed whenever a subscriber wishes to synchronize his or her portable device with aggregated data. Prior-art data synchronization methods do not offer optimum security or convenience as was described further above.

A system known to the inventor allows for instant log-in to network servers and services from portable devices through computer-station Internet hosts. The system has a first software instance executing on the computer station, including a location code (H-token) generator and a storage location reserved for the H-token, a second software instance executing on the network server, including a password code (P-token) generator, and one or more tables relating P-tokens, H-tokens, and subscriber's user names and passwords, a third software instance executing on the PD, and a storage location on the PD reserved for a P-token different than the user's password.

Upon a log-in request signal to the Internet Host (IH) from the PD, the IH opens a communication link to the network server, requests the P-token from the PD, and, receiving the P-token, furnishes both the P-token and the IH-stored H-token, if any, to the network server, and the network server, only upon finding a match between P-token, H-token, and a valid subscriber, validates log-in without requesting user name and password. Methods are provided for generating new P-tokens by enabled servers, sending the new P-tokens to enabled PDs, and associating the new tokens with users and location codes, to validate new PDs to the system, and also for generating new H-tokens, validating new Internet Hosts to the system.

This system eliminates the need for a user to provide password or login information to access a routinely visited data source, and offers a protection against a single-point security breech of the data-gathering and presentation service. The method and apparatus is a convenience to users that routinely access more than one network-based data source from a PD such as a PDA.

It is known in the art that in most data synchronizing schemes, when data is downloaded from a network server to a portable device, the data is typically downloaded in its entirety and indexed by time and date stamping in order that new data records may be determined. When many data records are being sent from a plurality of hosts, or compiled from the hosts by an aggregation server and then sent to a user, the process for comparing old data records stored on a receiving device and new data records included with old records sent takes considerable time and computing effort. This is partly because all available data is downloaded over the network before a determination is made concerning which of the plurality of records will actually be downloaded to the requesting device.

It has occurred to the present inventor that in instances wherein an Internet source sends data records for synchronization to a requesting portable device, bandwidth and resident memory are being utilized unnecessarily. In the case of a data aggregation service that compiles numerous records for numerous users, much bandwidth may be saved if only new records could be sent over the shared bandwidth to users.

What is clearly needed is a method and apparatus wherein only the latest data records for synchronization are transmitted from an Internet data source to a portable device such as a requesting PDA. Such a method and apparatus would enable data aggregation services and other data services to save considerable bandwidth and time when servicing a large number of users.

SUMMARY OF THE INVENTION

A system for synchronizing data records between a network data server and a requesting client device is provided, comprising a client software application and a network server software application. The system is characterized in that the client application maintains a first table of unique identifiers for data records stored at the client and sends a copy of the table with a request for data from the server, and the server maintains a second table of unique identifiers for candidate data records to be sent to the client, the identifiers at server and client formed by a common process, and in that the server, on receiving the request and first table from the client, compares the first table and the second table, then sends to the client only those records indicated by the comparison as new to the client and a notification of table updates.

In preferred embodiments the network is the Internet network. Also in preferred embodiments the identifiers are value pairs computed by a common function from header and body portions of data records. The common function used for creating identifiers is preferably a cyclic redundancy check (CRC) function.

In preferred embodiments the client updates the first table each time the client receives records and notification of table updates, and sends the updated table the next time data is requested. In some embodiments the requesting client device is a handheld portable device coupled to a host computer connected to the network, and the client software application executes on either or both of the portable device and the host computer. Formation of identifiers may be at a host computer or at a client.

In some embodiments of the invention there is an application program interface (API) enabling applications on the requesting client device to recognize and associate tabled identifiers with stored data records, displaying the records appropriately upon a user request.

In another aspect of the invention a method for synchronizing data records between a network data server and a requesting client device is provided comprising the steps of (a) maintaining a first table of unique identifiers for data records stored at the client; (b) sending a copy of the first table with a data request to the network server; (c) maintaining a second table of unique identifiers for candidate data records to be sent to the client; (d) comparing the first table with the second table to determine which requested records are, in fact, new records not already at the client device; and (e) sending only those records that are new to the client.

In some embodiments there is a further step for sending a notification of the difference in the tables to the client. Also in some embodiments the network is the Internet network.

In some embodiments the identifiers are value pairs computed by a common function from header and body portions of data records, and the function may be a cyclic redundancy check (CRC) function. Also in some embodiments the client updates the first table each time the client receives records and notification of table differences, and sends the updated table the next time data is requested.

In certain preferred embodiments the requesting client device is a handheld portable device coupled to a host computer connected to the network, and the client functions execute on either or both of the portable device and the host computer. Formation if identifiers in these embodiments may be accomplished at the host computer by a cyclic redundancy check process.

In embodiments of the present invention taught in enabling detail below, for the first time a truly reasonable system and method is taught, minimizing the bandwidth and computing power needed to synchronize records between network servers and portable devices.

BRIEF DESCRIPTION OF THE DRAWING FIGURES

FIG. 2 is an overview of an architecture for illustrating data-sync operations between network data-sources and various portable devices according to an embodiment of the present invention.

FIG. 7A is a table showing a header and a body of a typical data record.

FIG. 7B is a block-list of a plurality of records in a data repository.

FIG. 7C is a block-representation of CRC functions for a header and for a body of a data record.

FIG. 7D is a CRC table illustrating CRC pairs associated with corresponding records stored in a repository.

DESCRIPTION OF THE PREFERRED EMBODIMENTS

In order to provide users of network-capable portable devices (PDs) with ultimate convenience in a secure operating environment, the inventor provides a method and apparatus for data synchronization between a PD and a network-based data source that requires no password or log-in information to be repetitively provided to authenticate a user for the purpose of accessing personal information. The method and apparatus of the present invention is taught in the enabling disclosure below.

Figure 1:
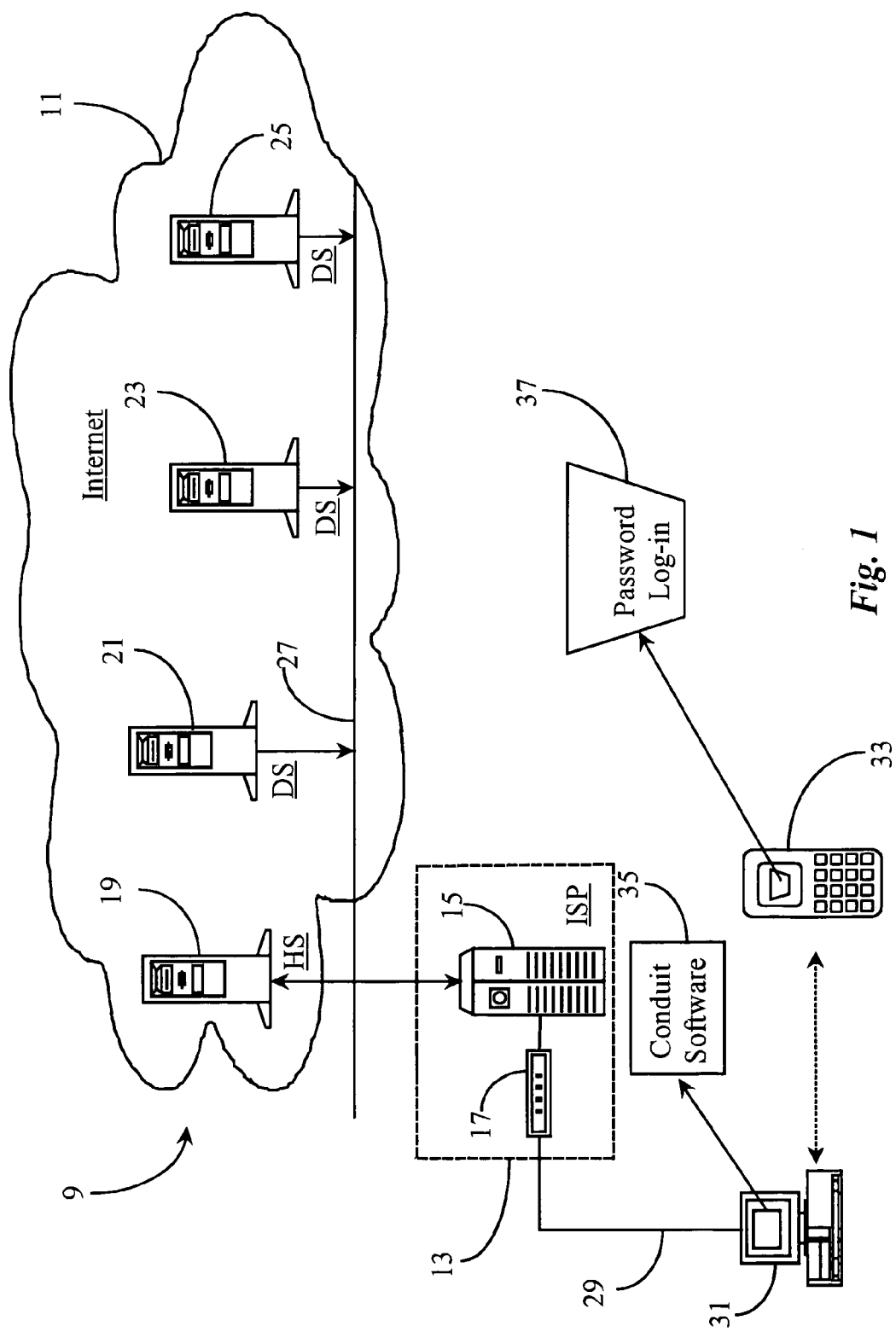
FIG. 1 is an overview of a data-sync connection between a network data source and a portable device according to prior art.

FIG. 1 is an overview of a network architecture to illustrate a data-sync connection between a network data source and a portable device according to prior art. In this simple, prior-art example, a data-communication network 9 comprises a data packet network (DPN) 11, which in this case is the Internet, and an internet-service-provider (ISP) 13.

Network 11 may be another type of data packet network instead of the Internet such as perhaps a private or corporate wide area network (WAN) as long as Transfer Control Protocol/Internet protocol (TCP/IP) or other suitable network protocols are supported.

Internet 11 may include any geographical portion of the global Internet network including such as data sub-nets. Internet 11 has an Internet backbone 27 distributed throughout, which represents the many lines and connections which comprise the wired Internet as is known in the art.

Three data servers (DS) 21, 23, and 25 are illustrated within Internet 11 and connected to backbone 27. Servers 21–25 are, in this prior art example, assumed to be "data sources" known in the art for serving data that is held for and requested by users. Users in many cases operate by connecting directly to data servers 21–25, or may alternatively connect and download data through such as a host server (HS) 19 illustrated at far left. The types of data that may be held will depend on the nature of the data server and somewhat on the nature of the portable device used to gain access. Typically servers 21 through 25 hold e-mail, bank-account information, securities trading information and the like.

ISP 13 is adapted, in this prior-art example, for providing Internet services as known in the art. Illustrated within ISP 13 are a main connection server 15 and a modem bank 17, illustrated herein as a single modem icon. Main server 15 is directly connected to Internet 11.

A personal computer (PC) 31 is illustrated in this example as having an active Internet connection to Internet 11 through ISP 13 via a telephone line 29 and by virtue of modem bank 17 as is typical in the art of Internet access. PC 31 is thus an Internet Host (IH) for a PDA 33 in this architecture. Line 29 may be a normal telephone line, an integrated services digital network (ISDN) line(s), or any other suitable wired connection. Other alternative Internet-access methods are known in the art and may be used. This prior art example illustrates the most common method (PC/modem).

PC 31 represents an exemplary user's PC that will act as an IH when the user is operating a connected peripheral device such as a PDA 33 illustrated to the right of PC 31. In this case PDA 33 maintains a wireless connection to PC 31 as illustrated by the dotted double arrow. The wireless connection may be such as a line-of-sight infra red system as known in the art. PDA 33 may also be connected to PC 31 by hard-wire connection, such a RS-232, TCP/IP, conventional serial port, Universal Serial Bus (USB), or any other suitable protocol.

This prior art example illustrates a simple data-sync connection between PDA 33 and any one of data servers 21–25, either directly or through a host server 19. In the practice of this prior art example, a conduit software application 35 is provided to run on PC 31 at a user's discretion. Software 35 is responsible for synchronizing data between PDA 33 and any one, or all of servers 21–25.

When a user operating PDA 33 desires to synchronize data with data stored on servers 21–25, he must first authenticate PDA 33 to the target data store via manual password and log-in requirement illustrated as manual operation 37. This log-in may alternatively be accomplished at IH 31. Once properly authenticated SW 35 may access secure data at servers 21–25 and synchronize the data with data already stored on PDA 33.

Typically, because each data server is a separate and non-cooperating entity, there will be more than one password and log-in requirement for the user to obtain authentication for all subscribed data.

One with skill in the art will recognize that the prior-art example represented herein may require considerable user resource in effecting synchronization of data between PDA 33 and a plurality of data sources such as those that would include servers 21–25.

Figure 2:
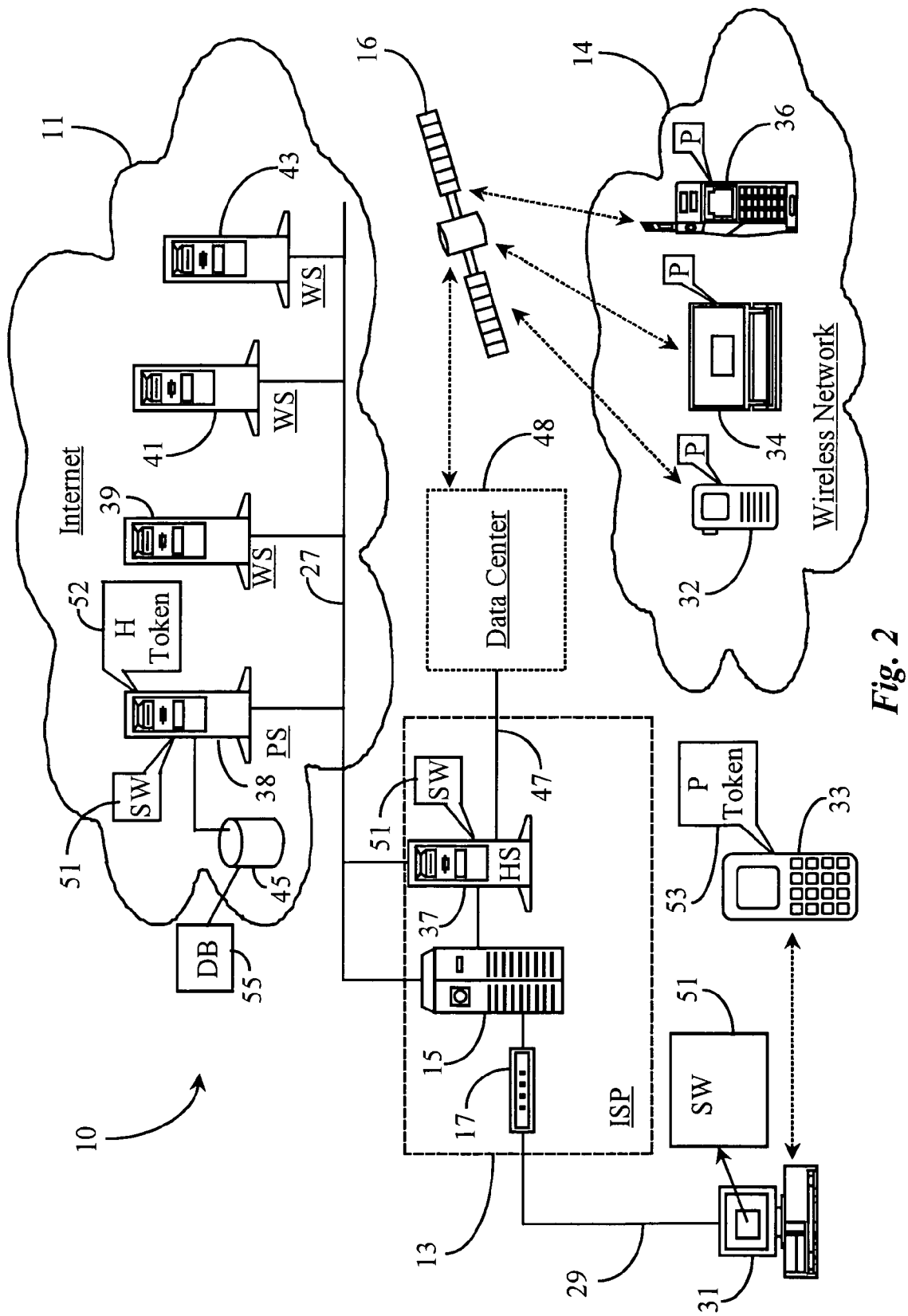
FIG. 2 is an overview of a data-sync process between a network data source and a portable device according to an embodiment of the present invention.

FIG. 2 is an overview of an architecture for illustrating data-sync operations between network data-sources and various portable devices according to an embodiment of the present invention.

In a preferred embodiment of the present invention, a unique authentication system for portable network devices is provided to be used in conjunction with a data gathering and presentation service that is already known to the inventors. One such service is that disclosed in the cross-referenced patent application Ser. No. 09/323,598 wherein Web summaries are gathered and made available to users operating any network-capable appliance including portable devices. The preferred embodiment also includes a previously disclosed enhancement described in the related application entitled "*Method and Apparatus for Abstract Restructuring of Personalized Data for Transmission from a Data Network to Varied Connected and Portable Network Appliances*" wherein data to portable devices may be aggregated and restructured for such devices based on device model and device-specific software protocol. It is to be understood, however, that practice of the invention is not limited to such aggregating and restructuring services.

In some other embodiments, the method and apparatus of the present invention may be implemented with other existing data gathering systems such as may be known in the art. In still other embodiments, the method and apparatus of the present invention may be used in conjunction with a system that is adapted solely for providing data to specific or varied portable devices.

Referring again to FIG. 2, communication network 10 comprises Internet network 11, ISP 13, a data center 48, and at least one exemplary wireless data network represented herein by element number 14. Internet 11 may be another type of data packet network instead of the Internet, such as perhaps a private or corporate wide area network (WAN) as long as Transfer Control Protocol/Internet protocol (TCP/IP) or other suitable network protocols are supported.

Internet 11 may comprise any geographical portion of the global network including such as data sub-networks connected thereto. Internet backbone 27 represents the many lines and connection points making up the wired Internet as was described in FIG. 1. In this embodiment, three Web servers (WS) 39, 41, and 43 are illustrated within Internet 11 and connected to backbone 27.

Servers 39–43 are, in this embodiment, file servers known in the art for serving data in such as hypertext markup language (HTML), XML, or other suitable languages associated with electronic information pages known as WEB pages in the art. A portal Server (PS) 38 is shown as an Internet-connected Web server, and represents an aggregating service as known to the inventors and taught in individual ones of the cross-referenced documents.

For example, WS 39 may be an on-line bank server containing general information and links to more personal data (source data) such as user account information, loan information, user profile information and the like. WS 41 may be a main server for an instant messaging company. Information pages contained therein may contain links to message servers, user account information, and so on. WS 43 may be a server providing stock tracking and purchase services to individuals through the Internet. Web servers 39–43 are not related to or affiliated with each other in this example. In prior art, a user would have to negotiate with each WS 39–43 separately in order to get access to source data hosted by such servers. It should also be noted here that there are many server combinations used by companies practicing their trades on the Internet. In most instances, separate machines are used for holding separate kinds of data such as for secure information as opposed to general information. However, this is not always true as some companies may combine all information and data on one powerful machine.

ISP 13 is enabled, in this example, for providing Internet access services as known in the art. Illustrated within ISP 13 are a main connection server 15, a host server (HS) 37, and a modem bank 17. Main connection server 15 is directly connected to Internet 11. Server 15 is adapted to maintain user Internet connections and other normal ISP interface routines. HS 37 provides enhanced services for the ISP, to provide, for example, Internet access for miscellaneous PDs via a data center 48 communicating by a satellite 16 with PDs 32–36. In this enhancement data protocols may be changed to protocols commonly used by PDs by unique software not shown in this illustration.

A Portal Server 38 in the Internet in this embodiment is enabled to aggregate data from other Internet Web servers, such as servers 39–43, and to provide aggregated data to subscribers, as taught in the cross-referenced documents. In this aspect, a data repository 45 contains data about individual subscribers to the service of the present invention. Repository 45 may be an optical storage facility or any other convenient facility that is adapted for warehousing data. Repository 45 is illustrated as connected to PS 38. In addition to holding data specific to individual subscribers such as account information, address parameters, user ID and authorization data, repository 45 may also hold aggregated data gathered from such as Internet 11 before being delivered to or being accessed by users. Also residing in repository 45 is a database (DB) 55 that contains tabled encrypted data representing multiple user passwords and log-in codes organized in tables that are essential to practicing the device authentication methods of the present invention. Such tables and their contents are described in further detail below.

HS 37 is connected to a data center 48 by a data link 47. Data center 48, among other tasks, provides an Internet interface to HS 37 for various wireless data networks represented by network 14. Network 14 is further characterized by the illustration of a communication satellite 16, which exhibits an exemplary wireless data link connection to data center 48 as illustrated by a dotted double arrow. As previously described, network 14 may be plural in the sense that plural wireless data networks specific to certain communication devices may accomplish an interface to HS 37 through such as satellite 16 or another type of wireless transceiver/receiver and data center 48.

Within network 14 is illustrated a plurality of Internet-capable appliances, which are in this example, portable devices (PDs). These are a pager 32, a notebook computer 34, and a cellular telephone 36. In this example, appliances 32–36 broadcast data, which is picked up by such as satellite 16 and relayed to data center 48. Similarly, data arriving to such as satellite 16 from data center 48 is broadcast and picked-up by appliances 32, 34, and 36 as illustrated herein with dotted double arrows representing respective communication links. In the case of appliances 32 and 36, network 14 would be a cellular network as typically implemented for those devices. In the case of notebook 34, network 14 may be a wireless Internet service using cellular or other suitable wireless technologies.

As previously described, main connection server 15 is connected to modem bank 17 as is known in the art of Internet access through an ISP. PC 31 is a user station operated by a user/subscriber to the data-gathering and presentation service, and is illustrated as connected to modem bank 17 by Internet connection line 29 as described in FIG. 1. Line 29 may be a normal telephone line, an integrated digital services network (ISDN) connection line, or any other suitable wired connection as was described in FIG. 1. PDA 33 is illustrated by a dotted double arrow as having a wireless communication link to PC 3, such as an infra-red communication link. This connection may also be by any suitable hard-wired link, such as serial, USB, and so on.

It was described in the background section that typical conduit software is used such as on a PC for synchronizing data between a data source and a portable device. It was also described that such software is generally proprietary in nature and covers only one host and affiliated data sources. The present invention provides a unique software application 51 that runs on any machine used as an Internet host (IH) for PDs. In this example the IH is PC 31. SW 51 enables instant and automatic security authentication for PDs according to embodiments of the present invention. Other instances of SW 51 are illustrated in this example as well. For example, an instance of SW 51 is provided on HS 37 to provide authentication services for PDs 32–36 connecting through data center 39. Yet another instance of SW 51 is provided to run on PS 38, and provides authentication services for requesting IH platforms for candidate PDs. There may be instances of SW 51 running on other Web servers as well. The several instances of SW 51 are not meant to indicate that the software is identical in each instance, but to indicate that the several instances are provided as compatible software which interact to provide the described features of the invention.

The device authentication methods of the present invention involve the use of binary strings (tokens). Some are generated randomly by SW 51 at IH devices, and some by SW51 at PS 38 or possibly at another Internet Web server. In a preferred embodiment, when a user operating an Internet-capable device, or a portable device having an Internet host such as PDA 33 or PDs 32–36 (FIG. 1) wishes to synchronize data with PS 38 or another Web server enhanced with software according to an embodiment of the present invention, he/she may simply initiate an automated secure process by depressing one button, making a single keystroke, or single-clicking with a mouse, for example.

Figure 3:
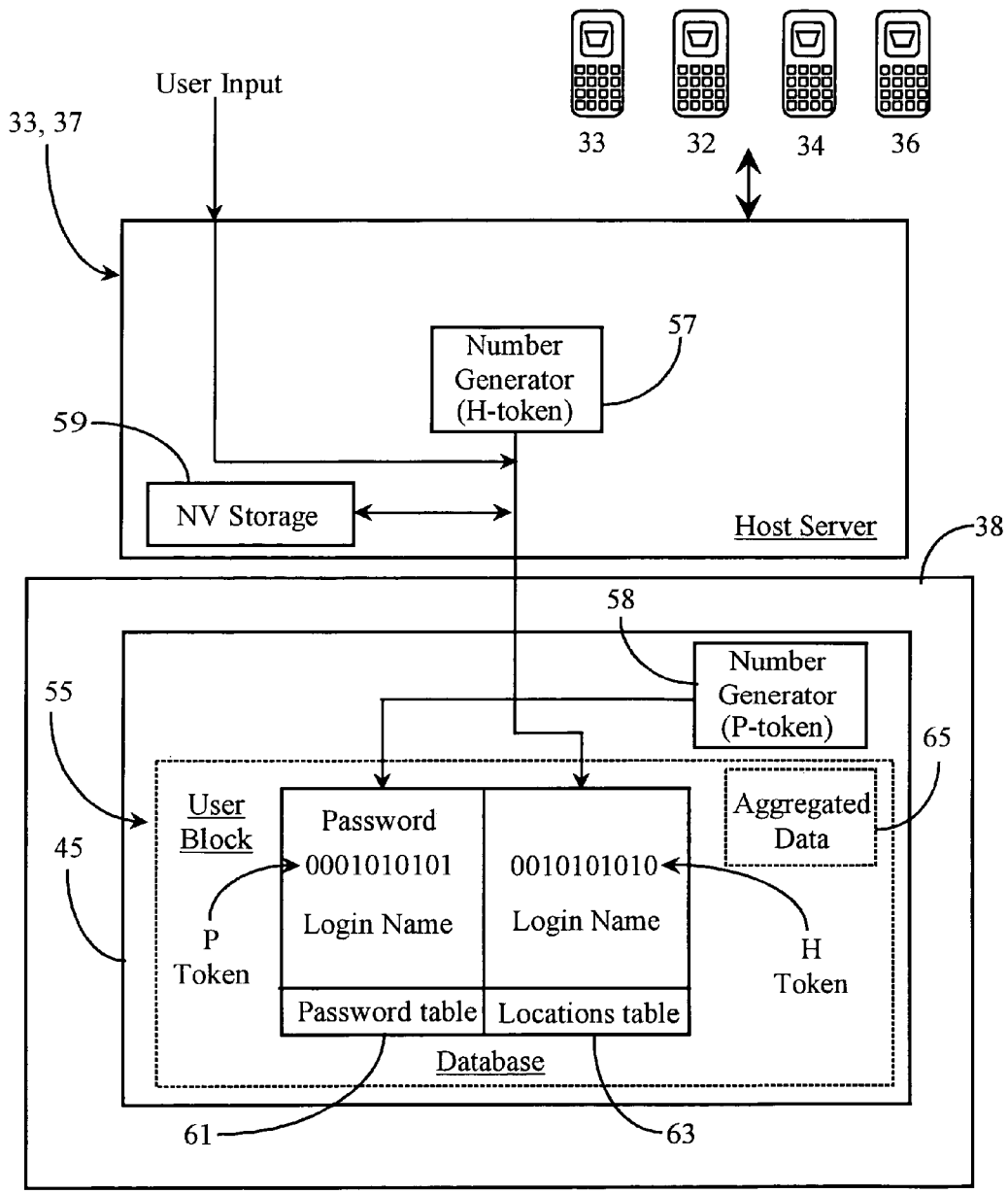
FIG. 3 is a block diagram illustrating token generation and storage according to an embodiment of the present invention.

FIG. 3 is a block diagram illustrating authentication architecture according to an embodiment of the present invention. PC Internet Host (IH) 31 or 37 has a number generator 57 (known in the art) adapted for generating random binary string tokens. This generator is a part of or associated with SW 51. The IH also has a non-volatile storage (may be local hard disk) 59 adapted for storing data.

The server-source with which data is to be synchronized, which is in this example Portal Server 38, has data repository 45 having data base 55 which is enabled by SW 51 to cooperate with IH devices and PDs to establish secure log-on according to embodiments of the present invention. There is a number generator 58 provided for generating random binary string tokens as is generator 57 in IH 31, 37. Database 55 stores user data including user ID, device configurations, and other user parameters as represented generally by a dotted rectangle labeled user block. Also maintained in database 55 are two tables, table 61, which is a password table, and table 63, which is a locations table. Database 55 may also comprise aggregated data represented by element number 65. Data 65 is requested synchronization-data collected from various Web sources by the data gathering and presentation service of the Portal Server 38.

Password table 61 stores user password tokens (P-tokens), user passwords, and user log-in names or codes. Locations table 63 stores user location tokens (H-tokens) and login names or codes. P-tokens are associated with H-tokens as described with reference to FIG. 2. Although only a single user-authentication data-set is represented in tables 61 and 63 in FIG. 3, it is noted that in actual practice, tables 61 and 63 will contain all of the authentication data-sets specific to all of the subscribers to the authentication service, all verified IH locations for each subscriber, and all P-tokens for PDs operated and verified for each subscriber.

The authentication system of the present invention is set up to provide easy one-button authentication for PDs through enabled IH devices, and to remember PDs authenticated to the system as well as which IH devices a user accesses for authentication. In the system of the invention instant authentication is enabled under the conditions that the user is a subscriber to the system, the PD used has been authenticated previously and has a stored P-token, and the IH through which the user attempts log-in is also authenticated to the system, having a stored H-token. Under these conditions the network server will have the P-token and the H-token stored and associated, and can quickly determine if the request for instant log-in is authentic.

There are four situations with which the system must deal in addition to the fully authenticated case of a valid subscriber with a valid PD and a valid IH. One is when a valid user/subscriber attempts to log-in through an authenticated IH with a new PD having enabling software but no P-token, this being a first-time use of the new PD with the system. Another is when a user with a valid PD attempts to log-in through a new IH. Still another is when both the PD and the IH are new to the system, but the user is a valid subscriber, and both the PD and the IH are enabled to operate with the system. The fourth situation is when a hacker attempts to log in, having found or stolen a valid PD, which will most likely occur through a non-valid IH.

In all cases other than a fully authenticated PD logging in through a fully authenticated IH, the system will ask for a user name and password. The first time a known user (subscriber) having a previously-used PD with a P-token logs on through a new IH device, he/she must provide a user name and password. In this initial process the IH device is identified (location) so subsequent log-ons may be automatic. If a user logs on from a different device, or new device other than one already identified in location tables at server-level, the user will be asked for log-in name and password again. If the new log-in is successful, the new H-token will be stored in location tables at server level, and added to the list of IH devices the user may use for automated access.

Figure 4:
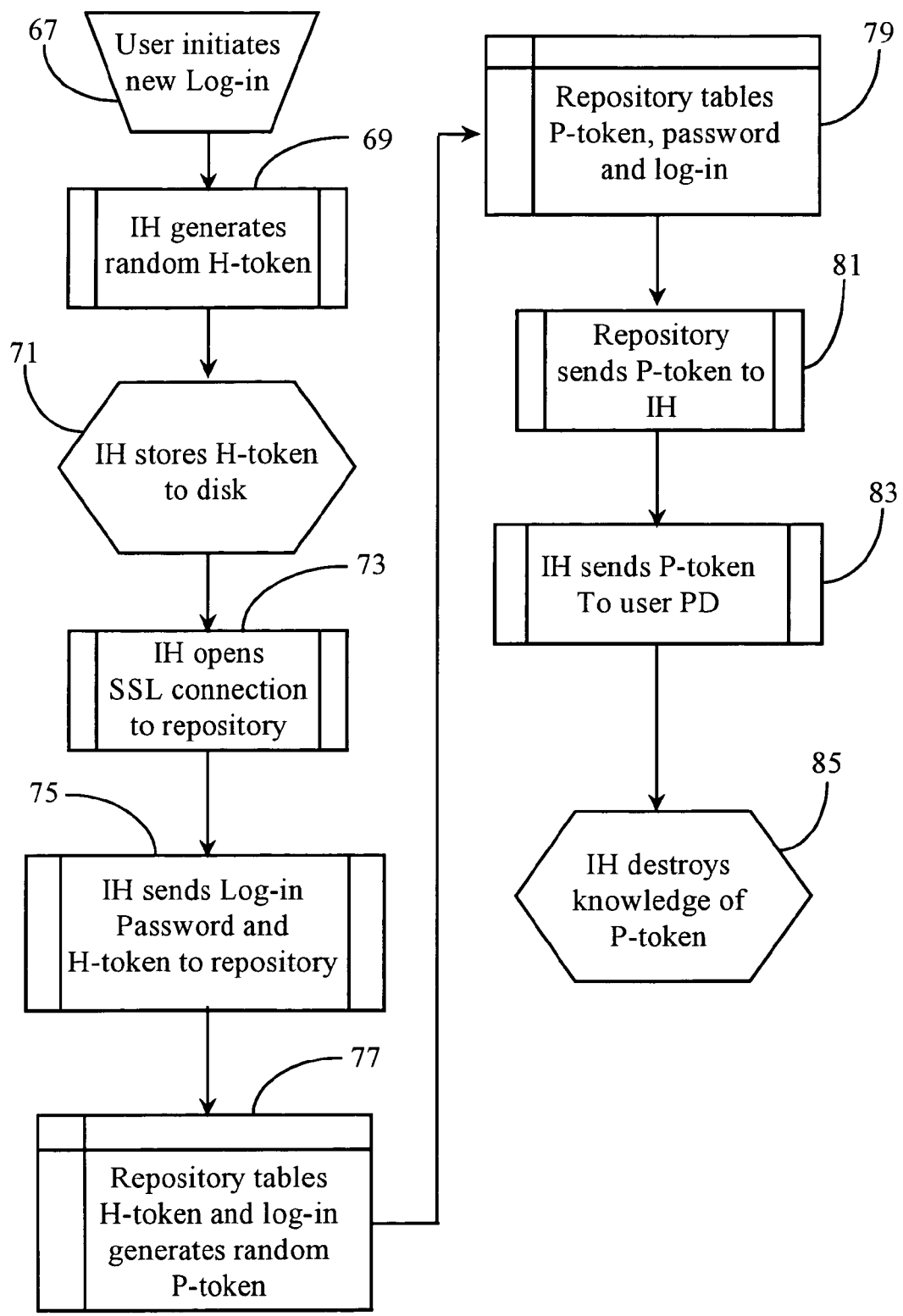
FIG. 4 is a process flow diagram illustrating logical steps for accomplishing a first time registering of a new host from a portable device according to an embodiment of the present invention.

FIG. 4 is a process flow diagram illustrating steps for accomplishing first time registering of a new Internet host (IH) by logging in from a new PD according to an embodiment of the present invention. In this example, it is assumed that the user in the example has previously provided password and log-in information such as user name and password to the data server, in this example Portal Server 38. The example will be most easily understood with reference to both FIGS. 3 and 4, and for simplicity will be assumed to involve PD 33, IH 31 and PS 38 as the network-level data source.

In step 67, the user initiates a log-in to the subscription service on PS 38 from PD 33, not before used for log-in using IH 31, not before used for log-in either. The user enters the correct password and log-in previously known to the secure server (38). IH 31, as a part of the process, generates a random H-token identifying IH 31 at step 69. At step 71, IH 31 stores the generated H-token to NV storage, such as to disk. For added security tokens are typically 32 bit binary words or longer, but may be shorter is desired.

In step 73 IH 31 opens a secure socket layer (SSL) connection (known in the art) to PS 38. In step 75, IH 31 sends the actual log-in, password and H-token to repository 45 at PS 38 over the secure connection. In step 77, repository 45 tables the generated H-token and the actual log-in name or code in table 63 of FIG. 3. Also at step 77, a random P-token is generated by the server (generator 58).

At step 79, repository 45 tables the generated P-token, actual password, and actual log-in name or code in table 61 of FIG. 3. At step 81, repository 45 sends the generated P-token to IH 33. At step 83, IH 31 sends the generated P-token to the user's requesting device, PD 33, where it is stored. At step 85, IH 31 eliminates all knowledge of the generated P-token at IH 31. A user is now configured through the system of the invention to automatically log-on and synchronize data from PD 33 with PS 38 through IH 31 without being required to repeat any authentication process such as re-entering a password or log-in. This may be done by a single-button input by the PD, for example. IH 31 has a stored, valid H-token and PD 33 has a stored and valid P-token.

It will be apparent to the skilled artisan that the process varies only in detail for the case where either the IH is new and the PD has a P-token, or the PD is new and the IH has an H-token. In either case the missing token will be generated and stored, and the system will require full user name and password before validating log-in.

Each time a user requests authentication through a new IH, the system will list another H-code to identify the new location. For example, the present user may now attempt to log-in to PS 38 through server 37 as IH. When the log-in is done, asking the user for name and password, a new H-code generated randomly by IH 37 will be listed in the location table at PS 38. A user may thus configure to have one-button service from any number of IHs by logging on through each.

Figure 5:
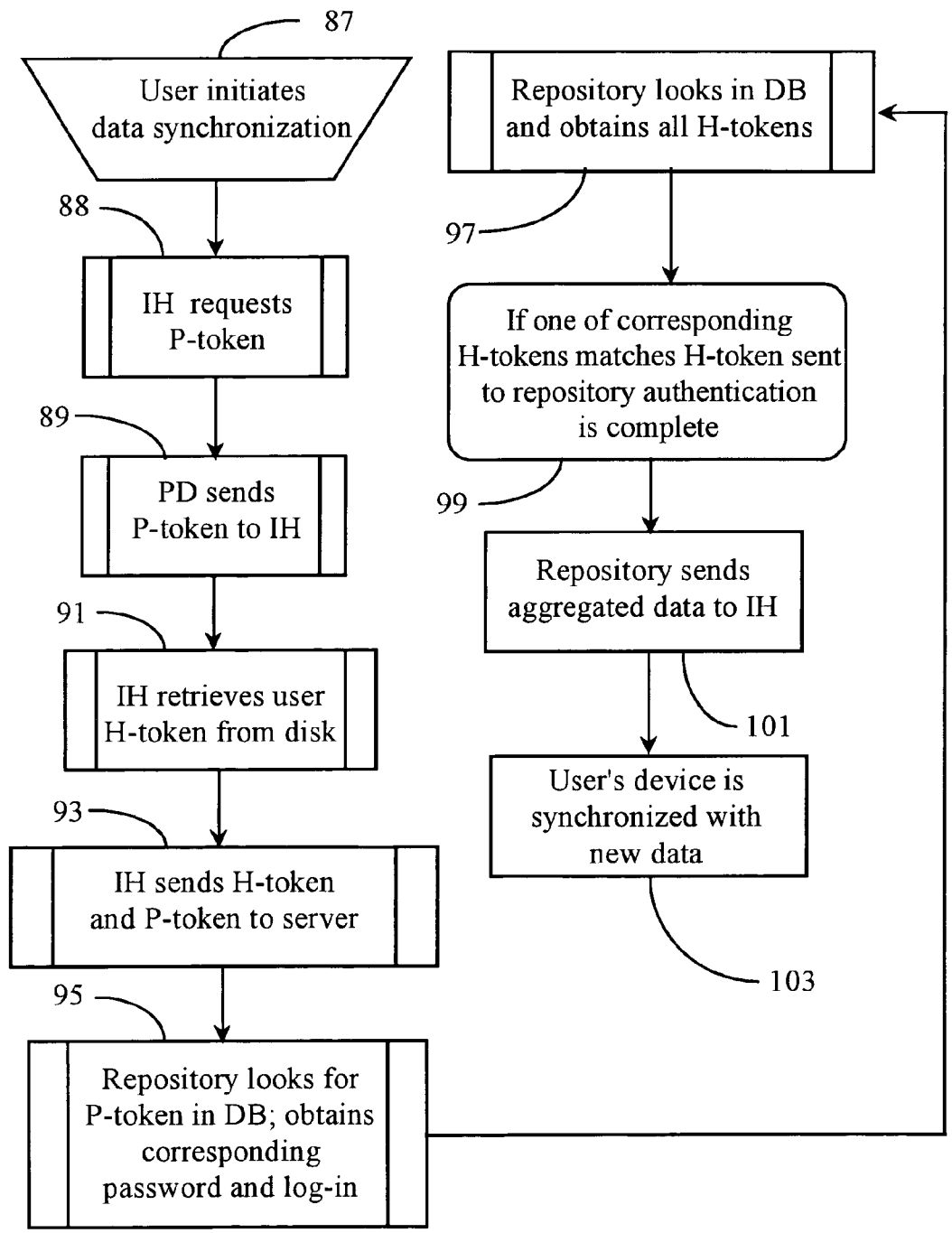
FIG. 5 is a process flow diagram illustrating logical steps for accomplishing a routine data-sync process from a portable device according to an embodiment of the present invention.

FIG. 5 is a process flow diagram illustrating logical steps for accomplishing a routine data-sync authentication and process from a portable device according to an embodiment of the present invention. At step 87, a user initiates an authentication and synchronization procedure by a one-button input on his/her PD, such as PD 33, through IH 31. IH 31 has been used previously for such log-in and data sync. At step 88 IH 31 requests a P-token from PD 33. At step 89 PD 33 send the stored P-token to IH 31. At step 91, IH 31 retrieves the H-token from its own internal storage (location code).

At step 93, IH 31 sends the H-token and P-token to PS 38. In step 95, repository 45 at PS 38 looks for the P-token in table 61 in DB 55, and finding the P-token listed there obtains the corresponding password and log-in name or code listed in the table. At step 97, repository 45 looks for and obtains corresponding H-tokens listed in table 62 (FIG. 2).

If at step 99, one of the corresponding H-tokens matches the H-token sent to repository 45 by IH 31, then authentication is complete. At step 101 then, the repository sends all collected and aggregated data to IH 31. The user's device is then synchronized with the aggregated data at step 103.

After following the descriptions above, it will be apparent that there are several advantages to the system of the invention. To hack the system, for example, requires two points of entry. If an attacker finds or steals a user's PD, and also finds a kiosk or other Internet host that is enabled with compatible software, when that attacker initiates the transaction with the one-button input, the system will generate at the IH a new H-code, which will not be found listed on the network-level server. The server part of the system will then demand the name and password, which of course the attacker will not know. To cheat the system requires that the attacker not only acquire the PD, but attempt the authentication through an IH already configured by the user, such as the user's home or office PC.

Data Synchronization

As described in the background section, it is desired that shared bandwidth may be saved over network connections when a plurality of user's portable devices (PDs) data-sync with a network-based server functioning typically as a data source. In order to accomplish this task, a new method for synchronization is provided wherein only new data records are sent over network paths. The method and apparatus of the present invention is described below.

Figure 6:
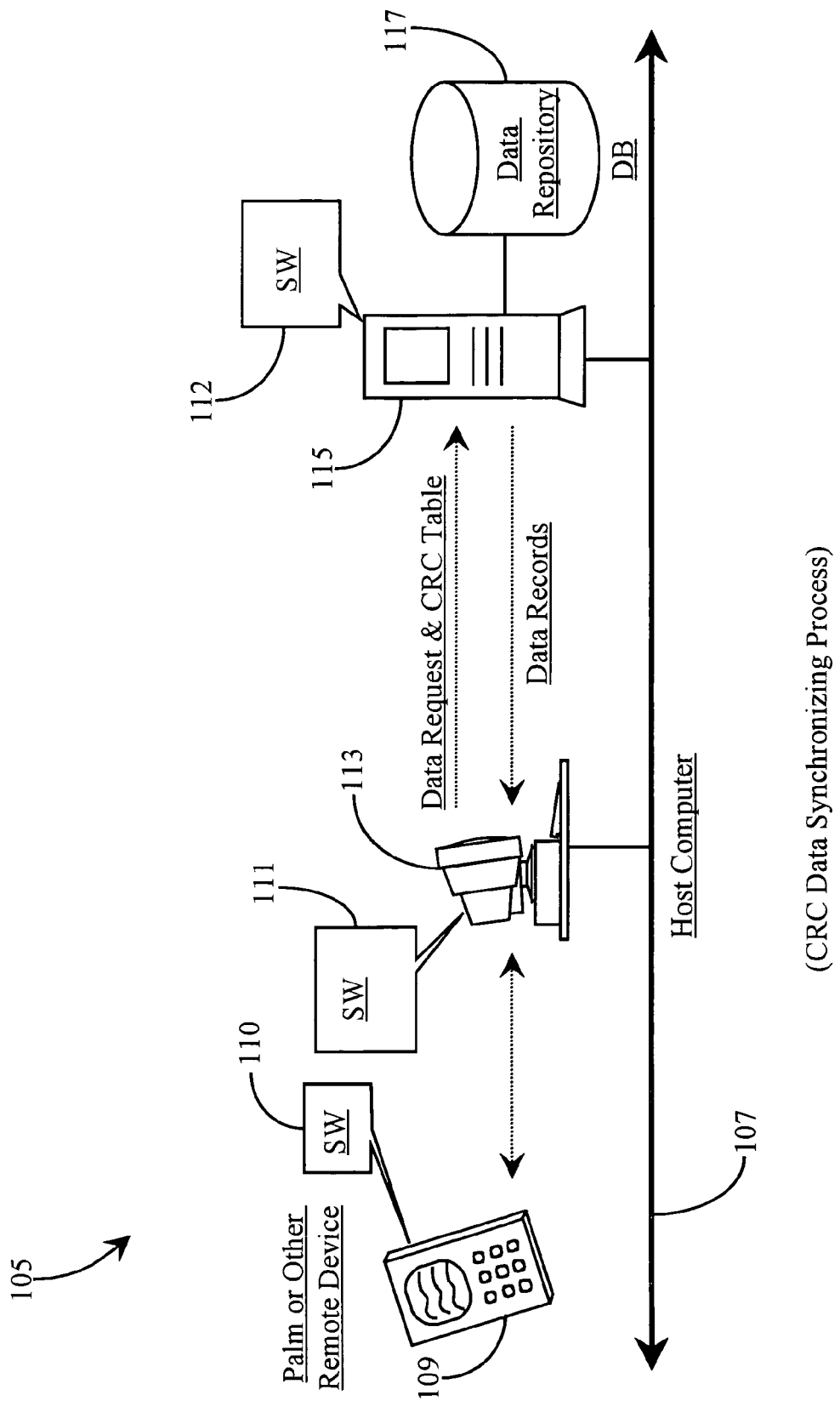
FIG. 6 is an overview of a network-architecture for illustrating a CRC table data-sync operation between a network data source and a portable device according to an embodiment of the present invention.

FIG. 6 is an overview of a network-architecture 105 for illustrating a CRC data-sync operation between a network-resident data source 115 and a PD 109 according to an embodiment of the present invention. Architecture 105 represents a network-based architecture wherein the method and apparatus of the present invention applies in a preferred embodiment. A personal computer (PC) 113 is illustrated herein as having connection to a network backbone 107. In a preferred embodiment, the present invention is practiced on the well-known Internet network, chosen by the inventor as a preferred medium because of its high public-access characteristic. The same inventive system could well be practiced in other network arrangements. Because the Internet is used in this example network backbone 107 is referred to hereinafter as Internet backbone 107. Internet backbone 107 represents the many links, connection points, and equipment which make up the Internet network as is known in the art. In this sense, there is no geographic limitation to the practice of the present invention.

Although not illustrated in this example, connection from PC 113 to Internet backbone 107 may be through an ISP, via a telephone connection by virtue of modem bank, as is typical in the art of Internet access. Other alternative Internet-access methods are known in the art and may be used as well. This above-described example illustrates a common method (PC/modem).

PC 113 represents an exemplary user's typically desktop PC that acts as a host PC when the user is operating a connected PD, such as a Palm Pilot™ or other remote device for the purpose of data synchronization with a network host. Such an exemplary device is illustrated in this example as a PD 109. PC 113 is an Internet Host (IH) for PDA 109 in this arrangement.

In this example, PDA 109 maintains a wireless connection to PC 113 as illustrated by the dotted double arrow. The wireless connection may be such as a line-of-sight infrared system as known in the art. PDA 109 may also be connected to host computer 113 by hard-wire connection, such a RS-232, conventional serial port, Universal Serial Bus (USB), or any other suitable system and protocol. In data synchronization with data source 115, PDA 109 logs-in to server 115 through PC 113.

Data source 115 is, in this example, a data aggregation portal server that retrieves typically personal data from other Internet sites for a user, such as the user of P 109, and will hereinafter be referred to as server 115 in this specification. Server 115 is illustrated as connected to backbone 107. In this case server 115 collects data from many Internet data sources and aggregates the collected data on behalf of requesting users. In another embodiment server 115 may simply be a data server hosted by and associated with a single data source such as a travel service and adapted and enabled for the practice of the present invention.

An instance of unique software (SW) 112 is provided to reside and execute on server 115. An instance of software 111 is also provided to reside and execute on PC 113. Software instances 112 and 111 are adapted and enabled to provide the data-synchronization function of the present invention using a novel scheme. SW instances 112 and 111 cooperate to enable data synchronization between server 115 and PDA 109. In this example an instance of software 110 is additionally provided to reside and execute on PDA 109. SW 110 is optional and represents an enhancement to the practice of the present invention according to one optional embodiment, which is explained further below.

A data repository 117 is provided in this example and is illustrated as connected to server 115 by a data link. Repository 117 stores data records compiled from various sources and aggregated on behalf of users subscribing to the service. Repository 117 may be an optical storage facility, an internal disk storage, or any other facility capable of storing and managing data.

In a typical prior art synchronization scheme, a user operating PDA 109 coupled to PC 113 would log on to server 115 in order to synchronize data records. Upon authentication of PDA 109 at server 115, server 115 would send all data held for transmission to PC 113 over backbone 107. PC 113 then would compare records already stored on PDA 109 with records received from server 115. Using a comparative technique such as comparing data and time stamps for each record, PC 113 would then send the relevant new data records to PDA 109. A problem with this method is that all of the data records are sent from server 115 even though PDA 109 may already have some or many of these records in updated state. Therefore, bandwidth between server 115 and PC 113 over backbone 107 is not wisely utilized. If many users are data-syncing simultaneously, degradation at server 115 may occur, and the network may be overloaded. Moreover, the above-described method may require more than one active transaction sequence between PDA 109 and server 115 and/or PC 113.

In a preferred embodiment of the present invention, SW 112 in cooperation with SW 111 provides a novel means for determining which data records stored in repository 117 are not stored on PDA 109 at network level. Using a simple check-sum method and a table comparison. Server 115 is then able to send only relevant new records to PC 113, which are then transferred to PDA 109. In a preferred application, the present invention, by virtue of SW instances 111 and 112 utilizing a cyclic-redundancy-check (CRC) function and a CRC table comparison operation, relevant data records are isolated at network level.

In practice of the present invention, and assuming that a user operating PDA 109 has already performed a first data synchronization according to the method and apparatus of the present invention, the user (not shown) activates PD 109, couples it to PC 113, and logs on to server 115 in order to synchronize data through PC 113. At time of login, PDA 109 is authenticated to receive data from server 115. This authentication process may simply consist of a user giving a password and a user name pair, or it may be accomplished by use of the token method as previously described in disclosure above. In a preferred embodiment of the present invention, in addition to authentication, PC 113, or optionally PD 109, sends a CRC data table (not shown in FIG. 6, but described more fully below) to server 115 as part of a data synchronization request. This data transmission is represented by a dotted directional arrow beginning at PC 113 and ending at server 115. Server 115 computes unique CRC identifiers for each data record stored in repository 117 on behalf of the user operating PDA 109. Server 115 tables the results in a separate CRC data table that will be compared with the one sent to server 115 during the synchronization request described above.

Unique CRC identifiers in the server's CRC table are compared with those in the user's CRC table. Any new CRC identifiers are added to the user's table and the associated data records held in repository 117 are accessed and sent along with the modified table back to PC 113 were they may be downloaded by PDA 109. This transmission, which completes the data synchronization transaction, is illustrated here in by a dotted directional arrow beginning and server 115 and ending at PC 113. By virtue of the process described above, which is enabled in this example by software instances 112 and 111, only the latest and relevant data records are sent over backbone 107 to PC 113. In this way shared bandwidth is not utilized unnecessarily, and the process of downloading data is minimized. Typically the entire process can be accomplished in a single transaction.

FIG. 7A is a table showing a header and a body of a typical data record 119. In a data packet, as is known in the art, a header identifies the nature and origin, and in some cases other characteristics of the packet, while the body contains the context of the data packet. Data record 119, for the purpose of the present invention, may be assumed to be a relatively simple record such as a flight reservation, a scheduled appointment, or any one of several other types of records that may be utilized by applications resident in an operating on PD 109 of FIG. 6. In other embodiments, data record 119 may be somewhat more complex such as a news summary, a financial statement, a purchase summary, or any one of several other types of records that may be compiled and in some cases summarized on behalf of a user.

FIG. 7B is a block-list 121 of a plurality of records stored in a data repository. List 121 contains a plurality of data records 0–N. records 0–N may be considered analogous to record 119 of FIG. 7A. That is to say that each record 0–N contains a header and a body. List 121 may be stored in repository such as repository 117 of FIG. 6. It is important to note here that data records 0–N may in some instances be created from parsed data obtained from disparate sources. For example, one data record may contain a compilation of data snippets obtained from more than one data source. In this case, a data record would be created from snippets obtained from various sources. In many cases, data records are already created at various data sources. As was previously described, the header of a data record will contain data that is not likely to change from record to record.

FIG. 7C is a block-representation 123 of CRC functions for a header and for a body of a data record. As known in the art, CRC is a method used to uniquely identify data records, wherein data is processed by the CRC function and assigned a unique number. Block 123 contains a representation of a CRC function for computing a unique bit string for a header (H), which is represented in the first-line. A second line represents a CRC function operating on data (D) of a body of a record, producing a second unique bit string.

Each computed CRC value in this preferred embodiment comprises a 32-bit number that is unique to each header and body of each data record. Each record that becomes available for transmission to a user is processed using the CRC technique. If there are any data changes within a header or within a body of a record that did not exist in a previous record from a same source, then the changes will be noticed by virtue of a different 32-bit number or numbers resulting from CRC comparison on each record. A CRC identifier for an entire record is, in this example, 64 bits, using both of the CRC-produced strings for a data record.

FIG. 7D is a CRC table 125 illustrating CRC pairs associated with corresponding records stored in a repository. CRC pairs, once created, are stored within a table 125. Table 125 comprises two columns, a header columns and a body column. CRC numbers are associated with each other as pertaining to one record. For example, at the top of the column labeled header, CRC 0 is illustrated. Directly to the right of that label is CRC 0 in the column labeled body. CRC 0 in the column labeled header is the unique 32-bit number identifying the header portion of record 0 and CRC 0 in the column labeled body is a unique 32-bit number identifying the body of record 0. This association technique is meant to be exemplary only and should not be construed as a limitation. There are, in other embodiments, other ways to associate the CRC number of a header with the appropriate CRC number of the body of the same record. In addition to associating the correct CRC values in table form, a tagging method is also used so that CRC pairs contained within table 125 may be mapped back to the appropriate records contained within list 121 of FIG. 7B stored in a suitable repository.

It will be apparent to one with skill in the art that there are many methods of associating values and mapping them back to data records stored in a repository. It will also be apparent to one with skill in the art that there are other ways for computing unique numbers for blocks of data. In a preferred embodiment of the present invention the CRC technique is used because of its accuracy, simplicity, and reliability.

Figure 8:
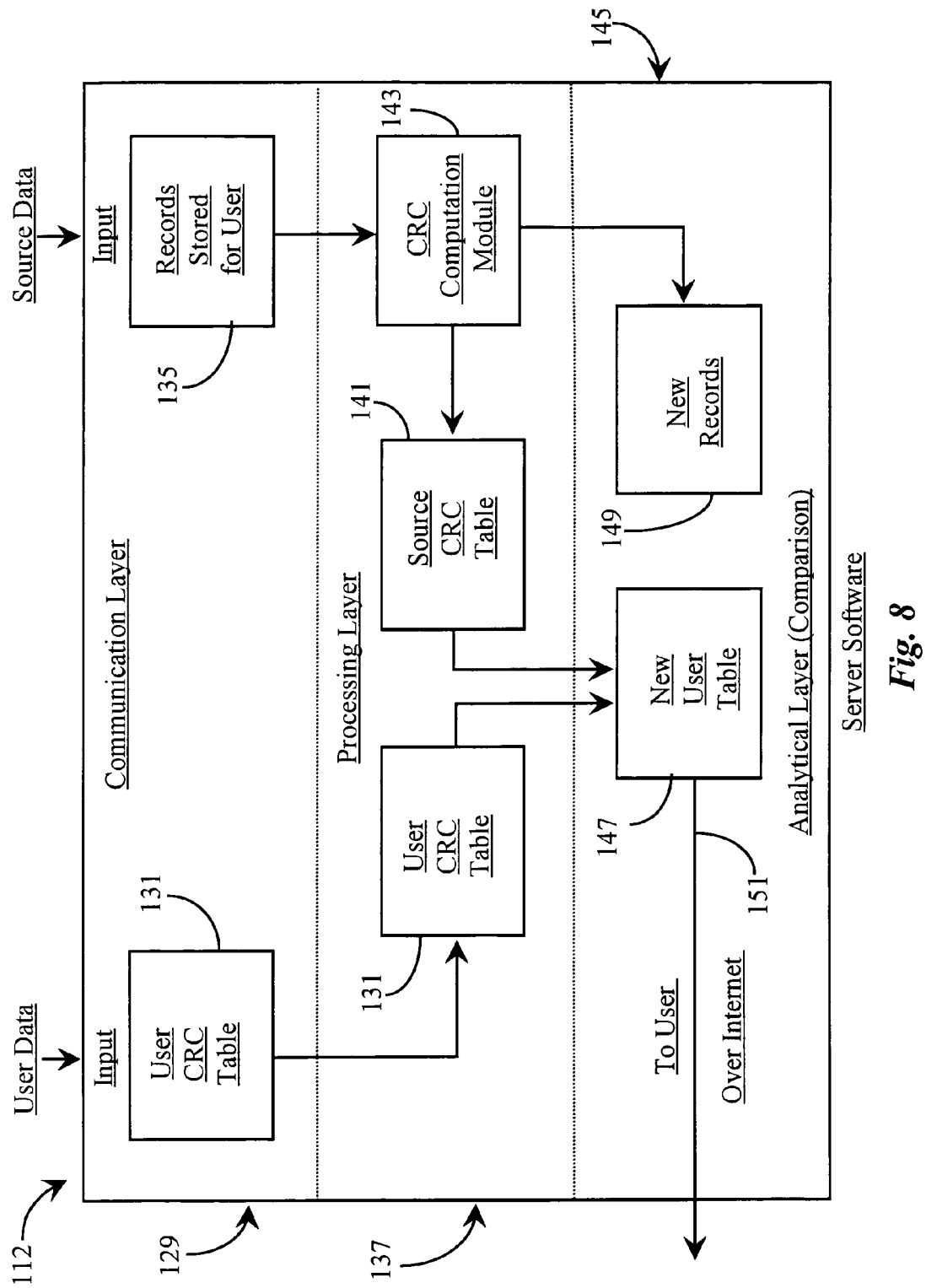
FIG. 8 is a block diagram illustrating functionality of server-side software for performing CRC synchronization according to an embodiment of the present invention.

FIG. 8 is a block diagram illustrating functionality of server-side software 112 for performing CRC synchronization according to an embodiment of the present invention.

Server software 112 comprises three basic layers, a communication layer 129, a processing layer 137 and an analytic or comparison layer 145. Communication layer 129 handles communication routines for server 115. It may be assumed here in that software modules required for enabling server communication on a connected network are present within layer 129 although they are not illustrated herein.

Within communication layer 129 a user CRC table 131 is provided and adapted as an add/subtract table containing CRC value pairs of data records which are already existing at the users end, for example, on device 109 or in PC 113 of FIG. 6. In one embodiment, table 131 is a separate table from the illustrated table 125 of FIG. 7D. In another embodiment, table 31 may be a shared table, in which case it may be assumed to be analogous to table 125 of FIG. 7D. CRC table 131 is illustrated as input and originating from a user by a directional arrow labeled user data entering layer 129.

Also illustrated within communication layer 129 is a block representing source data records 135 that are compiled and in some cases aggregated for a user. Block 135 will hereinafter be termed records 135 for the purpose of discussion. Records 135 may be internally sourced or created, or they may be obtained from other network sources already in the form of data records having a header and a body and which are ready for computation and comparison. Records 135 are analogous to block list 121 of FIG. 7B.

Processing layer 137 is responsible for data preparation and CRC computation to associate which data records may be available for transmission to user. Layer 137 accesses table 131 from layer 129 as is illustrated by a directional arrow connecting the two instances of table 131. A CRC computation module 143 produces new CRC value pairs for each data record of records 135. In an alternative embodiment these computations may be made off-line and the data records re-stored, and then re-accessed. A CRC source table 141 is produced from the new CRC value pairs computed by module 143 from data records 135. Table 141 may, in some embodiments, simply be a list of newly created CRC pairs representing records 135. Tabling of CRC pairs in table 141 is illustrated by a directional arrow emanating from module 143 and leading into table 141.

Layer 145 is responsible for comparing the new CRC pairs with user CRC pairs contained in table 131, resulting in a new user table 147 that includes any CRC pairs from table or list 141 that did not previously exist in user CRC table 131. According to a preferred embodiment, there are two comparison modes. Firstly, CRC header values from table 141 are compared with existing CRC header values contained within table 131. Secondly, body CRC values from table 141 are compared with a body CRC values contained within table 131. Any new values indicate changes in header and/or body portions of data records. All CRC values that match CRC values already contained in table 131 are ignored. Records 135 having matching CRC values are determined to be unchanged or records that were not updated since a last user access. Records having differing CRC values from those contained in table 131 are determined to be updated records. Only new records, illustrated herein by a block labeled 149 along with an updated user table, represented herein by a block 147, are sent back to a user, in this case, over the Internet network. This is illustrated herein by a directional arrow 151 labeled "To User Over Internet".

It will be apparent to one with skill in the art that there may be many more functional modules related to server processing, communication, data organization, and so on without departing from the spirit and scope of the present invention. The inventor has chosen only to illustrate the function of the present invention as performed within software 112. Software 112 may be, in one embodiment, integrated with standard server communication software. In another embodiment, software 112 maybe a standalone application that communicates with standard server software.

In some embodiments of the present invention the functionality illustrated herein and attributed to software 112 may actually be performed within software 111 executing on PC 113 of FIG. 6. Depending on network circumstances, data load, and available bandwidth, there are many instances wherein it might be decided at network level, that it would be more efficient for a particular user to do CRC computation at PC 113. Therefore, it may be assumed in this specification, that the functionality of software 112 has illustrated in this example may also be present on PC 113 as software 111.

Figure 9:
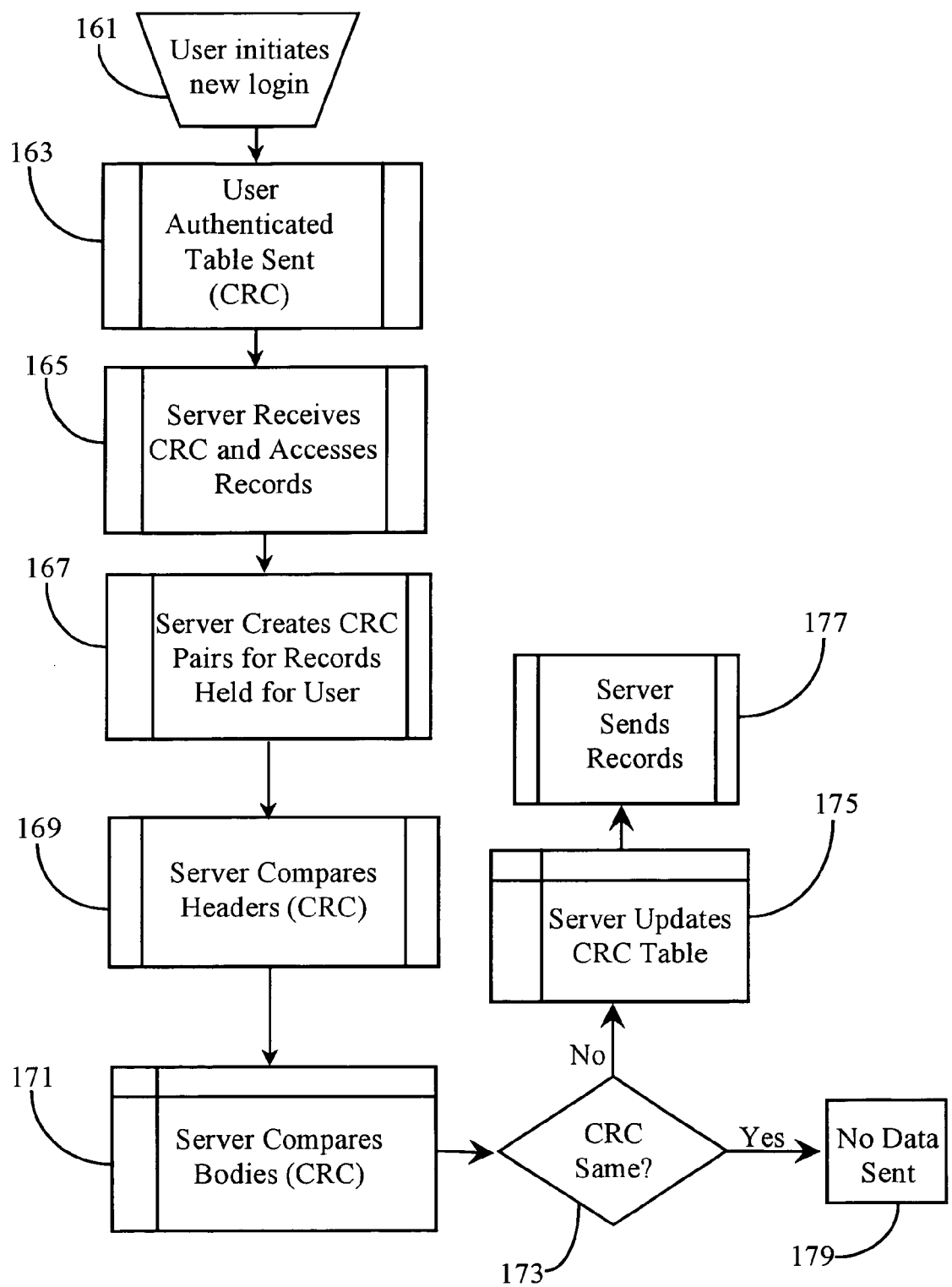
FIG. 9 is a process flow diagram illustrating steps in a CRC synchronization according to an embodiment of the present invention.

FIG. 9 is a process flow diagram illustrating logical steps for CRC synchronization according to an embodiment of the present invention. At step 161, the user initiates log-in from a remote device to a network host with a source-data server as exemplified in FIG. 6 in the arrangement between devise 109, PC 113 and server 115. At step 163, the user has been authenticated, and sends a user CRC table along with a data request. In one embodiment, the data request may be considered to be automatic at log-in. In another embodiment, a user may send a specific data request for specific types of records. Step 163 also assumes that a CRC table is a shared CRC table, which is passed back and forth between a user and a data source. However, this is not required to practice the present invention. In some cases, a CRC data table may be kept at the data source.

At step 165, the data source receives the data request and CRC table, which was sent in step 163. Also in step 165, the data source accesses any records available for transmission back to a user. At step 167, the server creates CRC value pairs for the records held for the user. In some embodiments, the data source or server may actually create records on behalf of the user from data obtained from various sources an aggregated for the user, and in other embodiments the CRC computations may be made and stored in advance of user data requests.

In step 169, the server compares CRC headers from the data at the server requested or otherwise intended for the user, with CRC headers in the user table sent in step 163. At step 171 the server compares the associated CRC bodies created in step 167 with CRC bodies contained in the table sent by the user at step 163. In step 173, if all of the CRCs are the same as those already contained within the table sent in step 163, it is determined that there are no new records, and no data records are sent (179). In this case, a simple message or code may be sent back to the user stating that there are no new records for synchronization.

If in step 173 it is determined that there are CRC pairs which do not match those sent by the user at step 163, then the user CRC table is updated at step 175. At step 177, the data records associated with the new CRC update are sent back to the user. In this way, a user may receive only records containing updates that the user does not already have.

It will be apparent to one with skill in the art that there may be more or fewer process steps than represented herein without departing from the spirit and scope of the present invention. In a preferred embodiment, an entire synchronization process comprises a single bi-directional transaction between a subscribing user and a data source.

The method and apparatus of the present invention may be practiced on any type of packet network by a variety of appliances. For example, a single user may own a host of network appliances that may in some instances require updating with the same records. In this case, the user needs only synchronize to one device. Ultimately when the user logs-in and with the other devices, the appropriate updates will automatically be sent to those devices by the service.

In still another embodiment, a user may be operating Internet-capable appliances that do not require a conduit PC for connection to the Internet. In these cases, for example, if the requesting device is a cell phone, CRC computation would always be performed at the network data-source. If however, the requesting device is a relatively powerful notebook computer, CRC computation may still be done at the user end.

In an enhancement of these embodiments taught herein, an application program interface (API) may be provided to execute on PD 109 of FIG. 6 such that when a user opens an application to display a data record, only the data record associated with the new CRC pair is displayed. The data record associated with the old CRC pairs still exist on PDA 109, however their CRC pairs may have been subtracted from the user CRC table. In this case, if a user wishes to review old records, they may be found in an archive section on PD 109. In this way, when a user selects a particular data record, only the latest and correct version of that record is displayed.

The method and apparatus of the present invention may be practiced with the data gathering and presentation service as known to the inventors. The method and apparatus of the present invention may also be practiced with virtually any Internet host that has locally-stored data or controls connected data sources. It is only necessary that the server portion of software 51 be implemented on the network server to enable interaction with local Internet hosts through which users may login. The spirit and scope of the present invention is limited only by the claims that follow.

What is claimed is:

1. A system for synchronizing data records between a network data server and a requesting client device comprising:
    a client software application;
    a network server software application;
    characterized in that the client application maintains a first table of unique identifiers for each separate data record stored at the client and sends a copy of the table with a request for data from the server, and the server maintains a second table of unique identifiers for each separate candidate data record to be sent to the client, the identifiers at server and client formed by a common process, and in that the server, on receiving the request and first table from the client, compares the first table and the second table, then sends to the client only those records indicated by the comparison as new to the client and a notification of table updates, and further characterized in that the identifiers are value pairs created from the header and body portions of the data records using a cyclic redundancy check (CRC) function.

2. The system of claim 1 wherein the network is the Internet network.

3. The system of claim 1 wherein the client updates the first table each time the client receives records and notification of table updates, and sends the updated table the next time data is requested.

4. The system of claim 1 wherein the requesting client device is a handheld portable device coupled to a host computer connected to the network, and the client software application executes on either or both of the portable device and the host computer.

5. The system of claim 4, wherein formation of identifiers is accomplished at the host computer.

6. The system of claim 1 further comprising an application program interface (API) enabling applications on the requesting client device to recognize and associate tabled identifiers with stored data records, displaying the records appropriately upon a user request.

7. A method for synchronizing data records between a network data server and a requesting client device comprising the steps of:
    (a) maintaining a first table of unique identifiers for each separate data record stored at the client;
    (b) sending a copy of the first table with a data request to the network server;
    (c) maintaining a second table of unique identifiers for each separate candidate data record to be sent to the client;
    (d) comparing the first table with the second table to determine which requested records are, in fact, new records not already at the client device; and
    (e) sending only those records that are new to the client; wherein the identifiers are value pairs created from the header and body portions of the data records using a cyclic redundancy check (CRC) function.

8. The method of claim 7 further comprising a step for sending a notification of the difference in the tables to the client.

9. The method of claim 8 wherein the client updates the first table each time the client receives records and notification of table differences, and sends the updated table the next time data is requested.

10. The method of claim 7 wherein the network is the Internet network.

11. The method of claim 7 wherein the identifiers are value pairs computed by a common function from header and body portions of data records.

12. The method of claim 7 wherein the requesting client device is a handheld portable device coupled to a host computer connected to the network, and the client functions execute on either or both of the portable device and the host computer.

13. The method of claim 12, wherein formation of identifiers is accomplished at the host computer by a cyclic redundancy check process.

* * * * *